United States Patent
Winkler (10) Patent No.: US 8,616,100 B2
(45) Date of Patent: *Dec. 31, 2013

(54) EMERGENCY BRAKING SYSTEM FOR MACHINE TOOLS

(75) Inventor: Thomas Winkler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/736,327

(22) PCT Filed: Mar. 31, 2009

(86) PCT No.: PCT/EP2009/053784
§ 371 (c)(1),
(2), (4) Date: Dec. 6, 2010

(87) PCT Pub. No.: WO2009/121863
PCT Pub. Date: Oct. 8, 2009

(65) Prior Publication Data
US 2011/0061504 A1    Mar. 17, 2011

(30) Foreign Application Priority Data

Mar. 31, 2008  (DE) .......................... 10 2008 000 891

(51) Int. Cl.
*B26D 7/22* (2006.01)
*F16D 51/16* (2006.01)
*F16P 3/00* (2006.01)
*F16D 59/00* (2006.01)

(52) U.S. Cl.
USPC .............................. 83/58; 192/129 R; 188/78

(58) Field of Classification Search
USPC ....... 83/58, 62; 192/129 R; 188/78, 186, 184, 188/185, 189, 180
See application file for complete search history.

(56) References Cited

U.S. PATENT DOCUMENTS

| | | |
|---|---|---|
| 2,047,556 A | 7/1936 | Harvey |
| 2,151,151 A | 3/1939 | Perez |
| 2,424,306 A * | 7/1947 | Denault .................. 318/261 |
| 2,451,373 A | 10/1948 | Beall |
| 2,808,905 A * | 10/1957 | Elfriede .................. 188/184 |
| 2,942,711 A | 6/1960 | Zindler |

(Continued)

FOREIGN PATENT DOCUMENTS

| | | |
|---|---|---|
| CN | 101980826 | 2/2011 |
| DE | 21 47 669 | 4/1972 |

(Continued)

OTHER PUBLICATIONS

"Cut Stop" (VDI/VDE/IT) by Institute fuer Wekzeugmaschiner (IFW) {Institute for Machine Tools} of the University of Stuttgart.
"Cut Stop" (VD/VDE/IT) by Institut für Wekzeugmaschinen (IFW) {Institute for Machine Tools} of the University of Stuttgart, 2007, pp. 62-65 and 70-73.

*Primary Examiner* — Ghassem Alie
(74) *Attorney, Agent, or Firm* — Kenyon & Kenyon LLP (57) ABSTRACT

An emergency braking system for a machine tool, for the abrupt braking of a rotating shaft, including at least one brake drum and at least one brake shoe which are brought into engagement with one another in order to brake the shaft. According to the present system, the system is configured in such a way that the braking engagement between the brake drum and the brake shoe takes place under the influence of a centrifugal force resulting from the rotation of a shaft as soon as a locking device is triggered.

13 Claims, 7 Drawing Sheets

(56) References Cited

U.S. PATENT DOCUMENTS

| | | | |
|---|---|---|---|
| 3,032,146 A * | 5/1962 | Szabo et al. | 188/171 |
| 3,333,821 A | 8/1967 | Pohl et al. | |
| 3,469,313 A * | 9/1969 | Martin | 30/122 |
| 3,533,357 A * | 10/1970 | Brandon | 104/113 |
| 3,576,242 A * | 4/1971 | Mumma | 193/35 A |
| 3,858,095 A * | 12/1974 | Friemann et al. | 192/129 A |
| 4,531,617 A * | 7/1985 | Martin et al. | 187/373 |
| 5,105,925 A | 4/1992 | Tremaglio et al. | |
| 6,213,258 B1 | 4/2001 | Dupuis | |

FOREIGN PATENT DOCUMENTS

| | | |
|---|---|---|
| DE | 87 08 955 | 12/1987 |
| DE | 195 36 995 | 4/1997 |
| RU | 27376 | 1/2003 |
| RU | 2291793 | 1/2007 |
| SU | 109478 | 11/1957 |
| SU | 474498 | 6/1975 |

* cited by examiner

EMERGENCY BRAKING SYSTEM FOR MACHINE TOOLS

FIELD OF THE INVENTION

The present invention relates to a safety system, in particular an emergency braking system for a machine tool, in particular for a circular saw, that deploys its protective effect within a very short time span, usually in the range of a few milliseconds (typically 1 to 50 ms), in order to protect a user of the machine tool from injury in dangerous situations.

BACKGROUND INFORMATION

Currently, there exist essentially three different approaches for realizing such a safety system for table and panel sizing circular saws, which are intended to prevent a user from coming into contact with the rotating saw blade or from receiving a severe cut injury as a result of such contact.

The safety system made by an American manufacturer and marketed under the trade name Saw Stop Inc. is an emergency braking system that enables braking of the machine tool on the basis of a direct engagement of a braking actuation mechanism with the saw blade as soon as a correspondingly designed sensor has detected a dangerous situation. Here, through the use of a hot-wire trigger, a rotatably situated aluminum block is pushed into the toothing of the running saw blade using a pre-tensioned spring, said block becoming wedged therein and in this way absorbing the rotational energy of all geometries of the machine tool that are in rotation during the sawing process. As a side effect, this one-sided application of force to the blade is used to sink the saw blade into the saw table through a specially constructed suspension situated on the saw table. Using this system, it is possible to avert severe bodily damage to the operator of the machine tool who triggers the safety mechanism. A disadvantage here is the direct contact with the processing tool, i.e. the blade geometry of the saw blade, because the breaking off of parts of the toothing poses an additional potential risk to the user. In addition, in order to restore the readiness of the safety system, it is necessary to exchange the braking unit, including the saw blade, with a replacement unit ready for use, which the user has to have in reserve in order to continue to work after a braking process using the safety function has taken place. This is connected with significant costs and a corresponding time outlay for acquisition and installation. In addition, it can be assumed that all components involved in the braking process, i.e. all rotating geometries of the machine tool, are exposed to a high degree of stress during the deceleration phase. Neither the manufacturer nor associated publications about this system supply data regarding the fatigue strength of this apparatus.

Another approach uses a safety system solely to lower the saw blade into the saw table without carrying out a braking process of the saw blade. Using a pyrotechnic priming charge, here the saw blade, including the main shaft and its bearing, are removed from the danger zone, so that serious injury to the user can be prevented. A disadvantage of this type of safety system is the necessity of the movement of relatively large masses, in the form of the systems that are to be lowered, under strict time requirements in the range of milliseconds. In addition, the pyrotechnic primers required for this, which turn out to be indispensable for this safety actuator system, result in an expensive partial reversibility, placing a limit in terms of time and also in terms of organization on immediate further processing using the machine tool with a safety system ready for use. Furthermore, due to limited constructive space and a very specific procedure of use, this safety system is suitable only for larger stationary devices, such as table circular saws, which permits such a construction in their interior. This system is not suitable for use with smaller, manually operated devices, such as miter saws and miter box saws or panel saws.

A publication of a publicly promoted project called "Cut-Stop" (VDI/VDE/IT), concerning a safety system for panel sizing saws, of the Institute for Machine Tools of the University of Stuttgart describes an approach that uses a special form of a disk brake installation, namely a self-amplifying wedge brake, to bring the main shaft of the machine tool and thus the saw blade to a standstill. Here, using a pyrotechnic primer, a wedge is accelerated and is subsequently pushed between a stationary wedge guide, in the form of a modified brake saddle, and the rotating brake disc. For the selection and combination of a specific wedge angle $\alpha$ and brake lining values $\mu$, the system works in a self-locking fashion, so that with this design the temporal demands on the braking process can be fulfilled as a function of the mass inertia that is to be decelerated. The disadvantage of this safety system, however, is that here as well, as is also described in the named publication, following the triggering of the safety actuator mechanism it is necessary to exchange the entire braking unit due to the wedge jammed in the friction pair. Here, a time outlay of approximately 10-12 minutes is required in order to completely restore system readiness. Thus, here as well there is a partial limitation of prompt system reversibility.

From DE 195 36 995 A1, a safety brake for elevators is discussed that has a device that, when a maximum speed of the transport device has been exceeded, brakes the drive with a deceleration that is a function of the speed, and also holds it there if warranted. The safety brake from DE 195 36 995 A1 acts immediately, as a function of the rotational speed, on the traction sheave of the cable-operated conveyor installation, and is able to limit the rotational speed thereof. The safety brake, fashioned as a centrifugal brake, additionally has a device for amplifying the braking force as a function of the conveying speed.

SUMMARY OF THE INVENTION

Based on this prior art, an object of the exemplary embodiments and/or exemplary methods of the present invention is to create a safety system for a machine tool, in particular a reversible safety system, having an alternative design that deploys its protective effect within a few milliseconds and at least partly removes the problems described above.

In order to achieve this object, the exemplary embodiments and/or exemplary methods of the present invention provides an emergency braking system for the abrupt braking of a rotating shaft of a machine tool, the emergency braking system having a brake drum and at least one brake shoe that are brought into engagement with one another in order to brake the shaft. According to the exemplary embodiments and/or exemplary methods of the present invention, in a first state the brake drum and the at least one brake shoe are secured by a locking device. If a dangerous situation is detected, the locking device of the braking system is released, i.e. deactivated, by a corresponding signal, so that the braking engagement between the brake drum and the brake shoe can take place under the influence of the centrifugal force or centrifugal acceleration resulting from the rotation of the shaft.

According to the exemplary embodiments and/or exemplary methods of the present invention, the at least one brake shoe is fastened pivotably to a brake shoe bearer that is situated on the rotating shaft and rotates together with this shaft.

A locking device can be displaced between a locked position, in which the brake shoe is held on the brake shoe bearer, and an unlocked position, in which the at least one brake shoe is released in such a way that it executes a pivot movement in the direction of the brake drum, in order to produce the braking engagement. In other words, the at least one brake shoe, which rotates with the rotating shaft, is moved abruptly, within a few milliseconds, in the direction of the stationary brake drum, making use of the centrifugal force of the rotating shaft, as soon as the locking device has been moved into its unlocked position.

Advantageously, in the braking device according to the present invention only a locking or unlocking force has to be applied to actuate the brake, because the force required for the braking power is produced by centrifugal forces of the system.

Because the locking or unlocking force is significantly less than the required braking forces, the locking can also be deactivated, i.e. released, very quickly. Together with a short braking time, this results in the very short time, in the range of milliseconds (typically 1 to 50 ms, advantageously in the range of 1 to 20 ms, in particular in the range of 10 ms and below), in which the braking system can brake the tool of a machine tool.

The locking device may include at least one locking element that is capable of being moved between a locked position, in which it engages with the at least one brake shoe, and an unlocked position in which it is decoupled from the brake shoe. Such a locking element can for example be fashioned as a locking bolt or the like.

The locking device advantageously has an actuator that moves the locking device from the locked position into the unlocked position.

This actuator can for example be a magnetic actuator that pulls a ring armature to which there is fastened a locking element in the form of a locking bolt, in order to disengage the locking bolt from the brake shoe, so that the brake shoe is released.

The exemplary embodiments and/or exemplary methods of the present invention is oriented towards the triggering of the braking system in a completely reversible fashion within a few milliseconds. After activation has taken place, a renewed triggering of the system using the same actuator is therefore advantageously possible. This prevents the incurring of the resulting costs that occur in the case of other trigger mechanisms. The actuator can be designed so as to have high fatigue strength, matching the necessary constructive space conditions for the demands of the particular application, and is thus in the ideal case maintenance-free.

The present actuator is capable of functioning in cooperation with an armature, which may be realized as an armature plate, which is drawn up at the moment of triggering. The action of force on the plate on all sides that results from this enables a uniform traction without transverse forces, so that a possible tipping of the armature plate is prevented. In addition, the supplying of current to the actuator and the resulting attraction of the armature enable very short reaction times of the system.

In addition, there is the possibility of a centric mounting of the actuator relative to the braking system, whereby, with the aid of the realization of the actuator as a pot magnet, the realization of a drive shaft, driven shaft, or axle in the center thereof is enabled. This is to be regarded as particularly advantageous.

Through this advantageous situation, it is in addition possible to attract a rotating armature using a magnet that is situated fixedly on the housing, which greatly simplifies the controlling of the actuator. For this purpose, the stroke of the armature plate must be consistently limited by stops in order to prevent wear of the armature plate, which is entrained in rotation, against the stationary magnet.

Accordingly, the exemplary embodiments and/or exemplary methods of the present invention is oriented towards the realization of the deceleration of the rotating shaft of the machine tool, which can be for example a table circular saw, a miter or miter box saw, or a panel saw, by using the existing rotational energy of the rotating shaft, with the aid of the design of a self-amplifying or self-locking frictional pair. In this way, the specified time frame of the braking, which is in the range of a few milliseconds, can be ensured. The design of the brake according to the present invention permits the braking of a tool driven directly or indirectly by a shaft in very short times, typically in the range of 1 to 50 ms, advantageously in the range from 1 to 20 ms, and in particular in the range of 10 ms and below.

Advantageously, during the braking of the machine tool engagement does not take place directly into the tool. Such an engagement would unavoidably destroy the tool. The machine tool according to the present invention brakes the shaft that directly or indirectly drives the tool. In this way, the tool itself remains undamaged. In particular, a reversible safety or brake device is possible.

In addition, the exemplary embodiments and/or exemplary methods of the present invention realizes an electromechanical system without the use of further forms of energy, which in some circumstances would endanger complete reversibility and would represent a limitation thereof.

It should be clear that the actual triggering of the braking process, which takes place for example as a response to an output signal of a sensor that detects a dangerous situation for the user, can take place mechanically, electromechanically, pyrotechnically, pneumatically, or hydraulically, and in principle is not connected with any particular medium; however, an electromechanical triggering may be used due to its configuration and very good reversibility.

In addition, the emergency braking system may include a clutch device that is designed in such a way that in its coupled position it connects the shaft that is to be braked to a drive train, and that during an emergency braking it is automatically moved into its decoupled position, in which the drive shaft that is to be braked is decoupled from the drive train. Such a decoupling of the drive train during an emergency braking procedure ensures that the drive train, which for example can include a drive shaft and possible transmission stages, is excluded from the actual braking process, so that the drive train is not exposed to the large deceleration moments that occur during the braking process. On the one hand, this has the advantage that components of the drive train cannot be damaged as a result of the braking process. On the other hand, the geometries of the drive-side components need not be constructively adapted to the requirements of the braking process, for which reason they can be made less robust and produced at lower cost. In addition, in this way there is a profitable reduction of the mass inertia moment that is to be decelerated, because the components of the drive train do not have to be braked. Thus, the system load during the deceleration phase can be significantly reduced. Correspondingly, the time duration required for the braking process of the saw blade can be significantly shortened with the same action of force. Alternatively, of course, the action of force can also be reduced while the braking time duration remains unchanged.

According to an exemplary embodiment, the shaft that is to be braked is fashioned as a hollow shaft in whose hollow space there is positioned a drive shaft of the drive train. Here, the clutch device is advantageously formed by a projection provided on the at least one brake shoe, which in the coupled position passes through an opening provided on the shaft that is to be braked, engaging in a recess in the drive shaft, so that the drive shaft and the shaft that is to be brakes are connected in rotationally fixed fashion to one another, and which, in the decoupled position, moves out of engagement with the recess in the drive shaft, so that the shaft to be braked is no longer driven by the drive shaft. In this way, a decoupling of the drive train during the braking process can be realized. The projection may engage with the recess with a positive connection, achieving a secure engagement of the projection in the recess. For this purpose, the projection can for example have a curved shape and the recess can have the shape of a prism.

Here it is to be noted that the number of projections need not correspond to the number of recesses. Thus, for example four recesses and only two projections may be provided. This is advantageous in that after a triggering of the emergency braking system the drive shaft need be rotated only slightly in order to again situate the projections in a pair of recesses. It is also possible to provide more than two brake shoes, of which however only two need be fastened to the drive shaft via corresponding connections formed from a projection and a recess.

In addition, the emergency braking system according to the present invention may have a reset device for moving, the at least one brake shoe back into its initial position in order to ensure complete system reversibility after a braking process has taken place. Here, the reset device is designed to be closely matched to the self-amplification of the frictional pair, and thus to the geometry of the braking system. The reset device can for example be realized through the use both of correspondingly dimensioned tensile spring elements and pressure spring elements.

In addition, the exemplary embodiments and/or exemplary methods of the present invention relates to a machine tool having an emergency braking system of the type described above, the machine tool may be a saw, in particular a circular saw, more precisely a table circular saw, a miter and miter box saw, or a panel saw.

However, it should be clear that the braking system according to the present invention is also applicable to other machine tools that, on a specific occasion, rely on a deliberately triggerable deceleration within a time frame in the range of a few milliseconds. An adaptation of the exemplary embodiments and/or exemplary methods of the present invention to a different machine tool is possible in individual cases.

In the following, exemplary specific embodiments of the present invention are described in more detail with reference to the accompanying drawings. The description, the associated Figures, and the further descriptions herein contain numerous features in combination. A person skilled in the art will also regard these features individually, in particular including the features belonging to different exemplary embodiments, and will combine them to form useful further combinations.

DETAILED DESCRIPTION

FIGS. 1 through 6 explain the design in principle of the emergency braking system according to the present invention.

Figure 7:
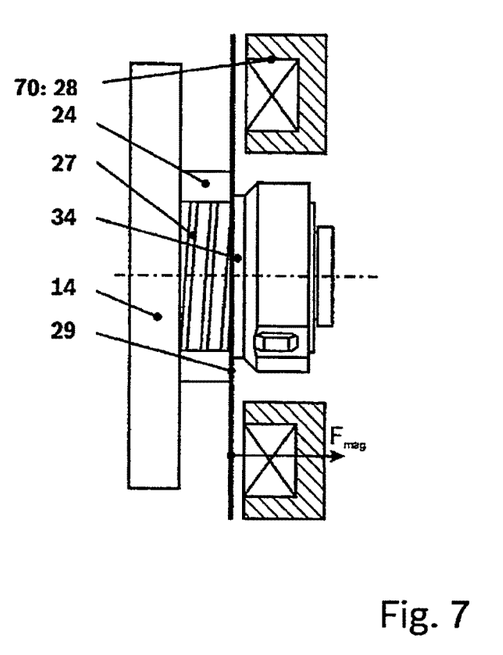
FIG. 7 shows a schematic representation of the actuator of the braking system according to the present invention.
Figure 8:
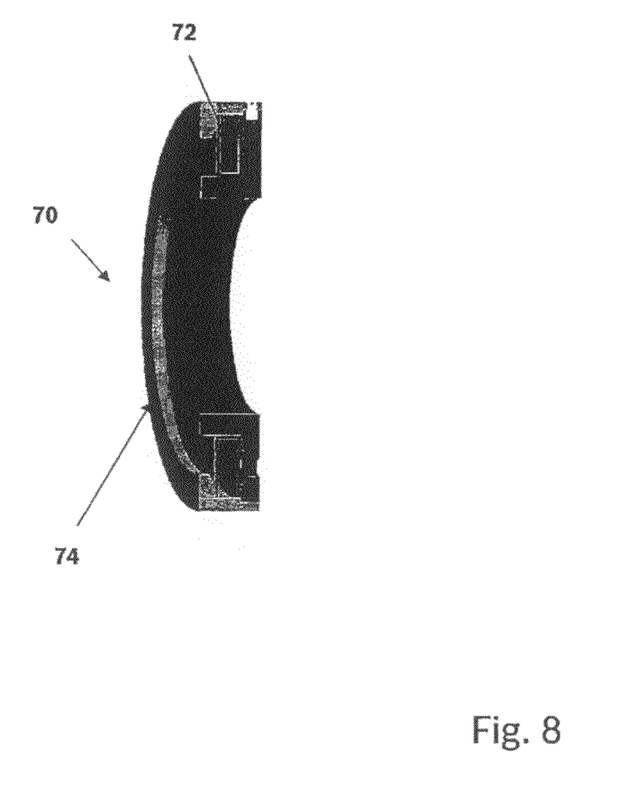
FIG. 8 shows a sectional view of the magnetic actuator.
Figure 9:
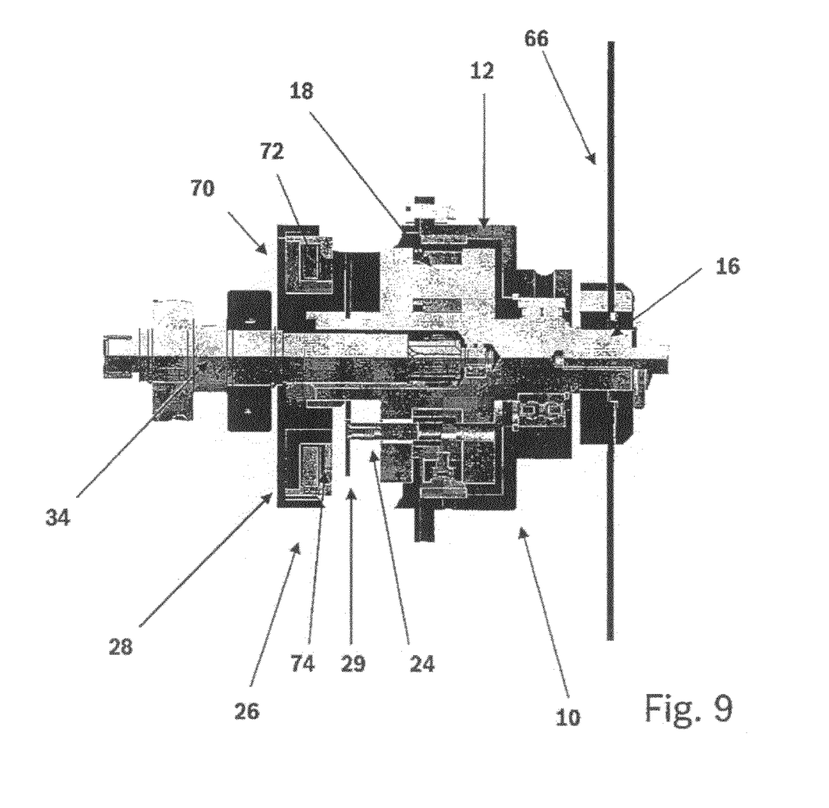
FIG. 9 shows a schematic representation of the braking system according to the present invention with locking device.

FIGS. 7, 8, and 9 describe details of the actuator of the locking device of the braking system according to the present invention.

Figure 10:
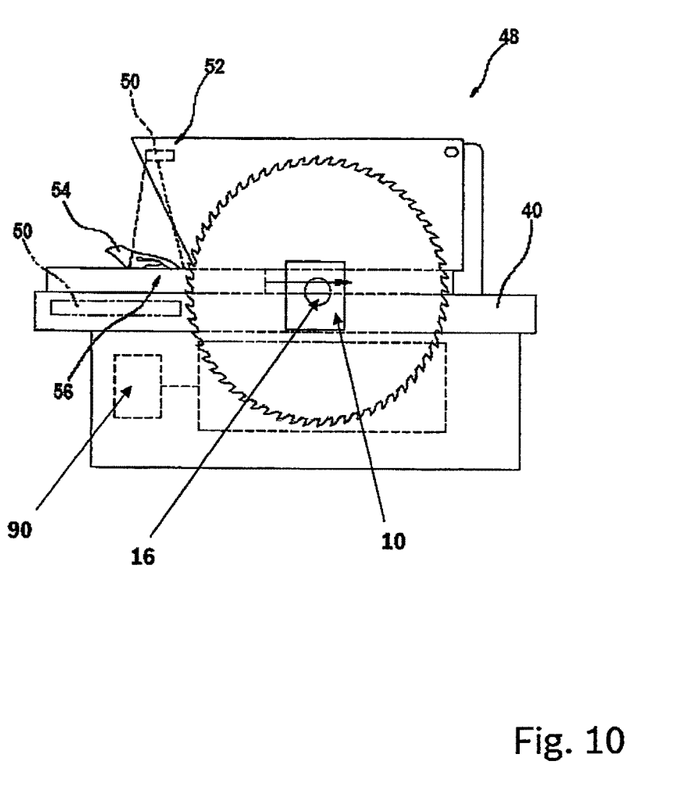
FIG. 10 shows an exemplary embodiment of a machine tool according to the present invention in the form of a table circular saw, in a side view.
Figure 11:
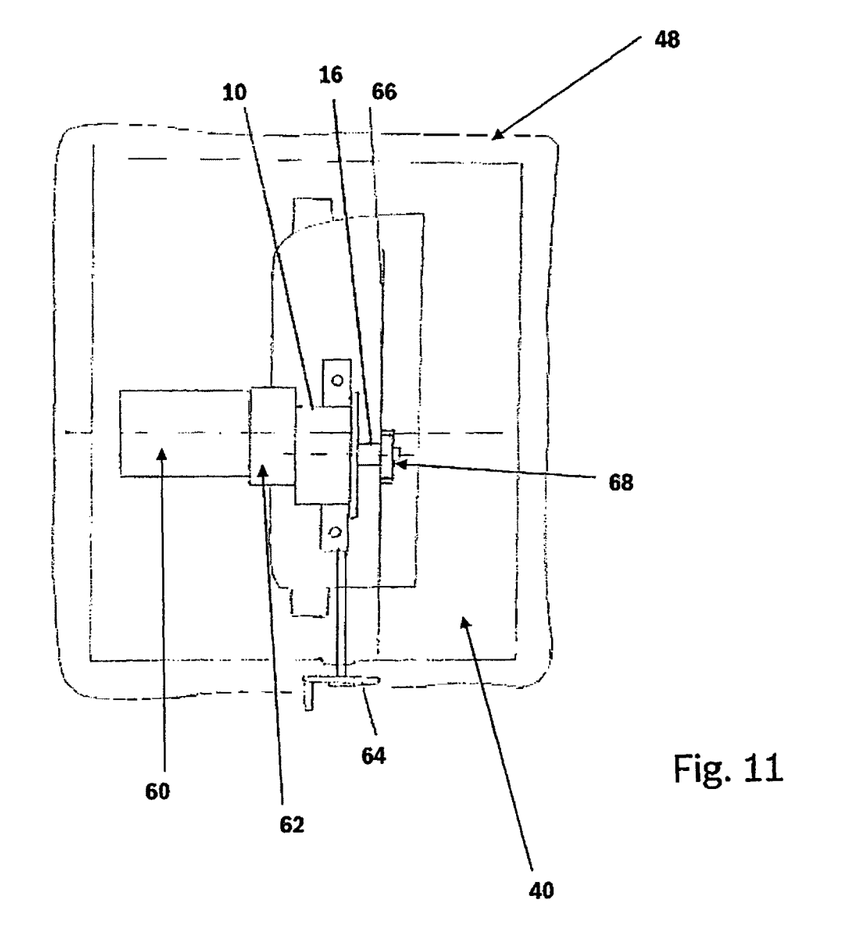
FIG. 11 shows an alternative exemplary embodiment of a machine tool according to the present invention, in the form of a table circular saw, in a top view.

FIGS. 10 and 11 show a machine tool according to the present invention in the form of a table circular saw having an emergency braking system according to the present invention.

FIGS. 1 through 6 show schematic views of an emergency braking system according to a specific embodiment of the present invention, which is designated overall by reference character 10, and which is used to bring, for example, a saw blade of a table circular saw (not shown; see FIG. 10) to a standstill in a dangerous situation within a very short time frame, in the range of a few milliseconds. Emergency braking system 10 includes a stationary brake drum 12 that is fastened to a frame component (not shown in more detail) of the saw. This frame component must be designed so that it withstands and can accept the braking torques that arise during the deceleration phase. In addition, emergency braking system 10 has a brake shoe bearer 14 that is connected fixedly to a driven shaft 16 at the saw blade side, so that the shoe bearer rotates together with this shaft in the direction of rotation identified by arrow 17. On brake shoe bearer 14, there are fastened two brake shoes 18 situated diametrally opposite one another, each mounted so as to be rotatable about a pivot bolt 20. Each brake shoe 18 is provided on its surface facing brake drum 12 with a friction facing 22, these friction facings 22 coming into engagement with stationary brake drum 12 during a braking process of emergency braking system 10, so that friction facings 22 and brake drum 12 form a frictional pair. In the state shown in FIG. 1, in which the braking process has not yet been triggered, brake shoes 18 are held fixedly on brake shoe bearer 14 with the aid of locking bolts 24 of a locking device 26, so that they cannot rotate about pivot bolts 20.

Figure 1:
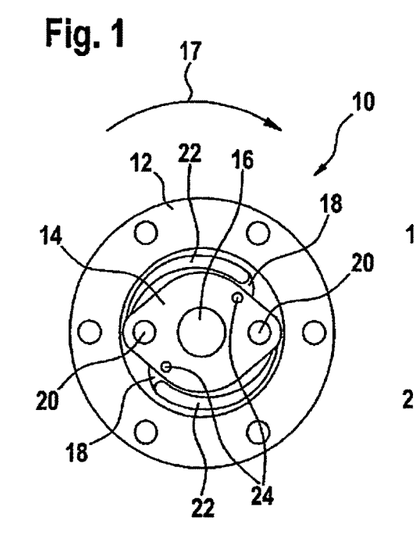
FIG. 1 shows a schematic front view of an emergency braking system according to a specific embodiment of the present invention, in a state in which the braking process has not been triggered.
Figure 2:
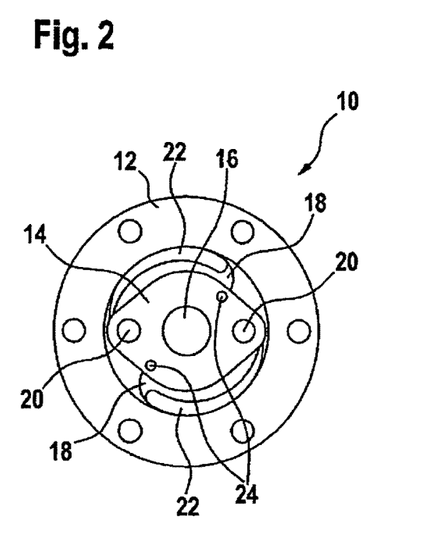
FIG. 2 shows a schematic front view of the emergency braking system shown in FIG. 1, in a state in which the braking process has been triggered.

These locking bolts 24 are part of locking device 26, which also has a magnetic actuator 28 with which locking bolts 24 can be displaced between a locked position, in which brake shoes 18 are held on brake shoe bearer 14, and an unlocked position in which brake shoes 18 are released in such a way that they execute a pivot movement about their pivot bolts 20 in the direction of brake drum 12 in order to produce the braking engagement between frictional facings 22 and brake drum 12.

Figure 3:
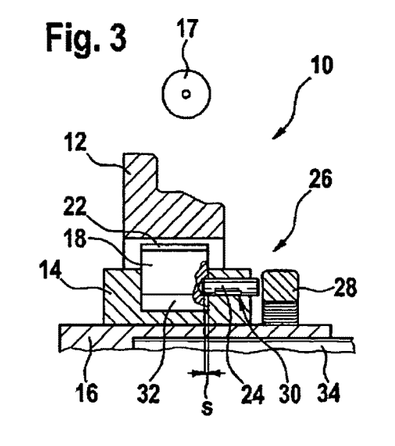
FIG. 3 shows a longitudinal sectional view of the emergency braking system shown in FIGS. 1 and 2, in a state in which the braking process has not been triggered.

As is shown in FIG. 3, magnetic actuator 28 of locking device 26 is fastened fixedly on driven shaft 16. Alternatively, magnetic actuator 28 can also be fastened to a stationary housing part (not shown) and can act on locking bolts 24 in contactless fashion. Locking bolts 24, which can be moved forward and back by magnetic actuator 28, extend through openings 30 provided in brake shoe bearer 14, and, in the state shown in FIGS. 1, 3, and 5 in which the braking process has not yet been introduced, engage in engagement openings 32 that are provided in each brake shoe 18. In this way, brake shoes 18 are arrested on brake shoe bearer 14.

Figure 4:
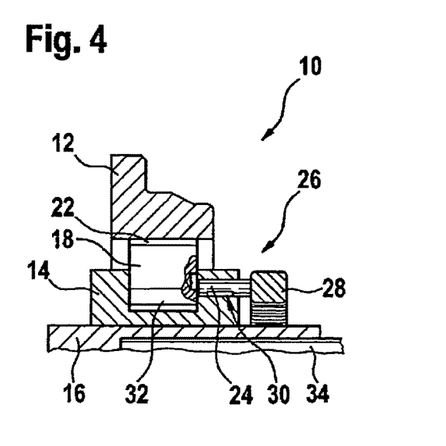
FIG. 4 shows a schematic longitudinal sectional view of the emergency braking system shown in FIGS. 1 through 3, in a state in which the braking process has been triggered.

In the case of triggering of the braking system, magnetic actuator 28 draws a ring armature 29, to which locking bolts 24 are fastened, out from brake shoe bearer 14 by a defined release path s, thus releasing brake shoes 18 (see FIGS. 4 and 9). Due to the centrifugal forces or centrifugal acceleration produced by rotating driven shaft 16, these brake shoes come into contact with stationary brake drum 12, causing the frictional pair required for the deceleration of driven shaft 16 to be formed between frictional facings 22 of brake shoes 18 and brake drum 12. Even though in the present exemplary embodiment locking bolts 24 are moved forward and back using magnetic actuator 28, it is to be noted that locking bolts 24 can also alternatively be moved under the action of a spring force 27 or the like in one of the two directions of movement. Thus, the forward movement of locking bolts 24 can take place under the influence of magnetic actuator 28, while the movement back of locking bolts 24 can take place using one or more spring elements 27, or vice versa (see for example FIG. 7).

Magnetic actuator 28, driven in the case of triggering, is made up of, as is shown in detail in particular in FIG. 8) a magnetic circuit 70 made up of a coil 72 and a magnetic back iron 74 that can be activated in the case of triggering. As is shown in particular in FIGS. 3 and 8, armature 29 is placed at a defined distance from actuator 28. This distance forms at the same time the dimension $s_L$ by which locking bolts 24 protrude in the braking system.

This armature 29 can be attracted by magnetic circuit 70 through a magnetic force $F_{mag}$, causing locking bolts 24 of the braking system to execute an equivalent movement. This causes braking system 10 to be activated. Here, magnetic actuator 28 is always attached fixedly for example to the housing so that it can support force $F_{mag}$.

FIG. 8 shows a model section through the magnet, showing the realization of a divided pack iron. This variant is advantageous in order to enable the installation of magnetic circuit 60.

FIG. 9 shows the situation of braking device 10, including locking device 26.

Figure 5:
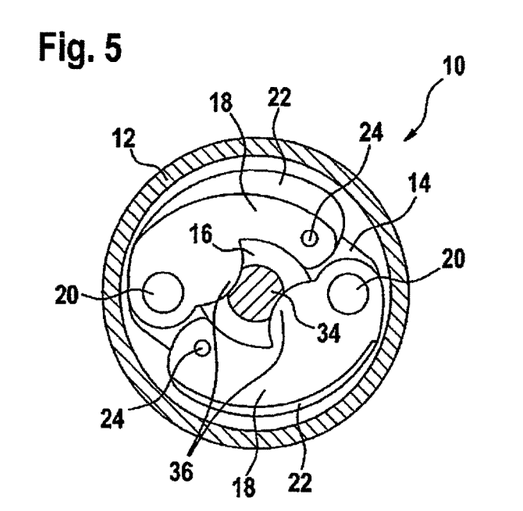
FIG. 5 shows a schematic cross-sectional view of the emergency braking system shown in FIGS. 1 through 4, in a state in which the braking process has not been triggered.
Figure 6:
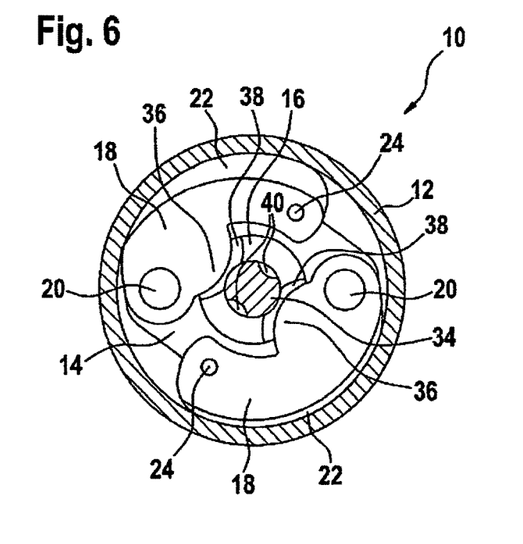
FIG. 6 shows a schematic cross-sectional view of the emergency braking system shown in FIGS. 1 through 5, in a state in which the braking process has been triggered.

As can also be seen in particular from FIGS. 5 and 6, driven shaft 16, which is to be braked using emergency braking system 10, is fashioned as a hollow shaft whose hollow space accommodates a drive shaft 34 that forms a part of the drive train (not shown in more detail). In order to connect driven shaft 16 and drive shaft 34 to one another in rotationally fixed fashion, curved projections 36 are fashioned on brake shoes 18 that protrude in the direction of the midpoint of driven shaft 16 and of drive shaft 34, each projection passing through openings 38 provided in driven shaft 16 and engaging in prism-shaped recesses 40 in drive shaft 34, as is shown in FIG. 5. The engagement of projections 36 provided on brake shoes 18 in the corresponding recesses 40 of drive shaft 34 connects driven shaft 16 and drive shaft 34 to one another in rotationally fixed fashion. If the braking process is introduced starting from the state shown in FIG. 5, brake shoes 18 rotate, after locking bolts 24 have been drawn out of brake shoes 18 by release path s, about their respective pivot bolts 20 in the direction of brake drum 12, so that projections 36 situated on brake shoes 18 move out of engagement with associated recesses 40 of drive shaft 34, causing drive shaft 34 to be decoupled from driven shaft 16. Due to this decoupling, the drive train is not exposed to the deceleration torques produced during the braking process, so that the drive train cannot be damaged. In addition, it is possible to make the components of the drive train less robust, because they are not subject to large loads during the braking process. Thus, for example the cross-section of motor-side drive shaft 34 can be made smaller than in the case in which no decoupling device is provided for decoupling the drive train. However, the decisive advantage that results here is that the number of components that are to be decelerated is reduced to a minimum. This has a positive effect on the system load during the deceleration phase, as was already described above.

Amplification factor C* of the braking system is defined as a function of the geometric dimensions of the design of the braking system; for the present design, this factor lies within the range of self-amplification or self-locking of the system. For this case of self-amplification or self-locking of the system, only a brief impulse is required in order to form the frictional pair, because brake shoes 18 are pressed against brake drum 12 as a result of the occurrent equilibrium of forces.

Due to the critical time conditions of the named braking system, it is inter alia conducive to the aim of the invention to select a design that enables the application of the technical principle of self-assistance. This means that the tensile force $F_{Sp}$ applied for the triggering is amplified by a multiple within the system, the produced reaction force $F_{Reakt}$, here in the form of a frictional force $F_R$, contributing in turn to the increase of the introduced tensile force $F_{Sp}$. This property is also called self-amplification or the servo effect. Systems characterized by this property supply in principle the shortest possible deceleration times with the use of low tensile forces, so that both the mass of the triggering elements and the required triggering time $t_A$ can be minimized.

Furthermore, the amplification factor is defined as follows:

$$C^* = \frac{F_R}{F_{SP}} = \frac{\mu \cdot \tan\alpha}{\tan\alpha - \mu}$$

If the factor C* is positive, the forces act in the direction assumed in the drawing. Here, frictional force $F_R$ results from the tensile force $F_{SP}$ multiplied by the factor C*. For $\mu=\tan\alpha$, the equation for C* has a pole, so that this amplification factor goes to infinity. At this point, in practical terms the system state of a labile equilibrium prevails. For the selection of the parameter $\tan\alpha<\mu$, there results a negative amplification factor C*. This means a theoretical reversal of the direction of tensile force $F_{SP}$ that would have to occur in order to maintain the equilibrium of forces. In reality, this case characterizes a special state of a self-amplifying system. The friction block is here additionally pressed against the belt conveyor by the resultant frictional force F. Due to the resulting continuous mutual increase in the frictional and normal forces, in the ideal case adhesive friction occurs within the friction pair after a short time. This results in blocking of the overall system. In this context, one speaks simply of self-locking. Advantageously, forces occur here that are greater than the forces communicated by the centrifugal force of the brake shoes.

As a function of the relative coefficients of friction μ of the frictional partners, there thus result angles α that designate areas in which self-amplification or self-locking occur. Here it may be advantageous to make the frictional facing of at least one friction or braking partner non-homogenous.

On the basis of the previously described design of emergency braking system 10, the time interval for the trigger time of the braking process can be greatly shortened, because the braking engagement between brake drum 12 and brake shoes 18 takes place under the influence of the centrifugal force or centrifugal acceleration resulting from the rotation of driven shaft 16. In addition, there is a self-amplifying, and even self-locking, action of the braking, so that this increases the braking effect, and the braking times can be advantageously shortened.

Due to the use of a two-sided attack of the frictional circumferential force of the frictional pair, the roller bearings used in the present case are protected, and do not have to be overhauled or even redesigned as a result of demands made on the life span of the overall system, which would in turn bring an increased mass inertia into the system.

In addition, a design as described in the present application avoids rotating outer geometries of the brake unit, so that an easily encapsulated closed system having a compact construction can be realized, which also integrates positively with the special requirements of work safety connected with the use of machine tools.

It should be clear that the actuation of magnetic actuator 28 takes place through the output signals of corresponding sensors that detect a state in which an operator comes dangerously close to the saw blade of the table circular saw. Such sensors are known in the prior art, so that they are not described in more detail in the present description.

FIGS. 10 and 11 show exemplary embodiments of a machine tool according to the present invention, having an emergency braking system 10 and a sensor system 52 for recognizing the presence of a type of material, in particular tissue, such as the human tissue of a hand. Circular saw 48 shown in a side view in FIG. 10 is a table circular saw (benchtop system) and has a recognition device 52 that is provided in order to recognize the presence of a type of material 54, in particular for example tissue, in the work area 56 of a machine tool. Detection device 52 has at least one sensor 50 that can be installed in a plane above the work area of the machine tool, as is indicated in FIG. 10. Alternatively, sensor 50 of device 52 can also be integrated directly into work table 40. Both possibilities can be realized both individually and simultaneously, as is shown as an example in FIG. 10. Device 52 for the detection in particular of human tissue, but also of other materials, can include, as an example and not exclusively, radar sensors, in particular UWB (ultra wide band) radar sensors, and/or optical sensors, in particular NIR (near infrared) systems.

Upon the detection of, for example, a hand 54 in the danger area immediately in front of the saw blade of the machine tool, an activity signal is generated that releases safety bolts 24 of brake shoes 18, so that, as described in detail above, these shoes, driven by the centrifugal force, are driven against brake drum 12, introducing the braking process.

FIG. 11 shows the exemplary embodiment of a table circular saw 48 in a top view. A motor 60 drives, via a transmission 63, a tool, which in the exemplary embodiment shown in FIG. 9 is a saw blade 66. Saw blade 66 is fastened to a driven shaft 16 via a clamping device 68. Emergency braking system 10 is situated advantageously between transmission 63 and shaft 16; i.e., makes it possible in the case of application to decouple shaft 16 from the driving transmission 63. In the case of an emergency braking, overloading of the transmission stage is thus avoided. The transmission stage and a motor shaft are then decoupled from one another as a result.

Although a table circular saw was used as an example of a machine tool in the previously described specific embodiment, it should be clear that the principle of the present invention is also applicable to other machine tools.

Finally, it should be clear that the above-described specific embodiment of the emergency braking system according to the present invention is in no way limiting. Rather, modifications and changes are possible without departing from the scope of protection of the present invention, which is defined by the accompanying description.

What is claimed is:

1. An emergency braking system for a machine tool, for the abrupt braking of a rotating shaft, comprising:
   at least one brake drum;
   at least one brake shoe, wherein the at least one brake drum and the at least one brake shoe are brought into engagement with one another in order to brake the rotating shaft;
   wherein the braking engagement between the brake drum and the brake shoe takes place under the influence of a centrifugal force resulting from the rotation of the rotating shaft when a locking device is released,
   wherein the locking device has an electromagnetic actuator that converts the locking device from a locked position to an unlocked position,
   wherein the rotating shaft is stopped within 50 ms.

2. The emergency braking system of claim 1, wherein the locking device can be adjusted between a locked position, in which the brake shoe is held on a brake shoe bearer, and an unlocked position in which the at least one brake shoe is released in such a way that the at least one brake shoe executes a pivot movement in the direction of the brake drum.

3. The emergency braking system of claim 1, wherein the locking device has at least one locking element that is movable between a locked position, in which the at least one locking element engages with the at least one brake shoe, and an unlocked position in which the at least one locking element is decoupled from the brake shoe.

4. The emergency braking system of claim 3, wherein the at least one locking element is connected to an armature that interacts with the actuator.

5. The emergency braking system of claim 1, wherein the actuator is supplied with current to bring the locking device into the unlocked position.

6. The emergency braking system of claim 1, wherein the at least one brake shoe is fastened pivotably on a brake shoe bearer that is positioned on the shaft and rotates therewith.

7. The emergency braking system of claim 1, wherein the emergency braking system has a reset device for moving the at least one brake shoe back into an initial position of the at least one brake shoe.

8. The emergency braking system of claim 7, wherein the reset device has at least one tensile and/or pressure spring element.

9. The emergency braking system of claim 1, wherein the braking occurs within 50 ms.

10. The emergency braking system of claim 1, wherein the emergency braking system is a reversible safety system.

11. A machine tool, comprising:
an emergency braking system for a machine tool, for the abrupt braking of a rotating shaft, including:
- at least one brake drum;
- at least one brake shoe, wherein the at least one brake drum and the at least one brake shoe are brought into engagement with one another in order to brake the rotating shaft;
- wherein the braking engagement between the brake drum and the brake shoe takes place under the influence of a centrifugal force resulting from the rotation of the rotating shaft when a locking device is released,
- wherein the locking device has an electromagnetic actuator that converts the locking device from a locked position to an unlocked position,
- wherein the rotating shaft is stopped within 50 ms.

12. The machine tool of claim 11, wherein the machine tool is a table having a circular saw.

13. An emergency braking system for a machine tool, for the abrupt braking of a rotating shaft, comprising:
- at least one brake drum;
- at least one brake shoe, wherein the at least one brake drum and the at least one brake shoe are brought into engagement with one another in order to brake the rotating shaft;
- wherein the braking engagement between the brake drum and the brake shoe takes place under the influence of a centrifugal force resulting from the rotation of the rotating shaft when a locking device is released,
- wherein the locking device has an electromagnetic actuator that converts the locking device from a locked position to an unlocked position,
- wherein the locking device includes at least one locking bolt extending through openings in a brake shoe bearer.

* * * * *

UNITED STATES PATENT AND TRADEMARK OFFICE
CERTIFICATE OF CORRECTION

PATENT NO.        : 8,616,100 B2                                           Page 1 of 1
APPLICATION NO. : 12/736327
DATED             : December 31, 2013
INVENTOR(S)       : Thomas Winkler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 28 days.

Signed and Sealed this
Twenty-second Day of September, 2015

Michelle K. Lee
*Director of the United States Patent and Trademark Office*